July 11, 1950  J. R. ALMOND ET AL  2,515,029
VALVE
Filed Sept. 10, 1945  2 Sheets-Sheet 1

INVENTORS.
JOHN R. ALMOND &
WILLIAM C. BOSWORTH
BY  *Louis W. Helmuth*
ATTORNEY.

July 11, 1950  J. R. ALMOND ET AL  2,515,029
VALVE
Filed Sept. 10, 1945  2 Sheets-Sheet 2
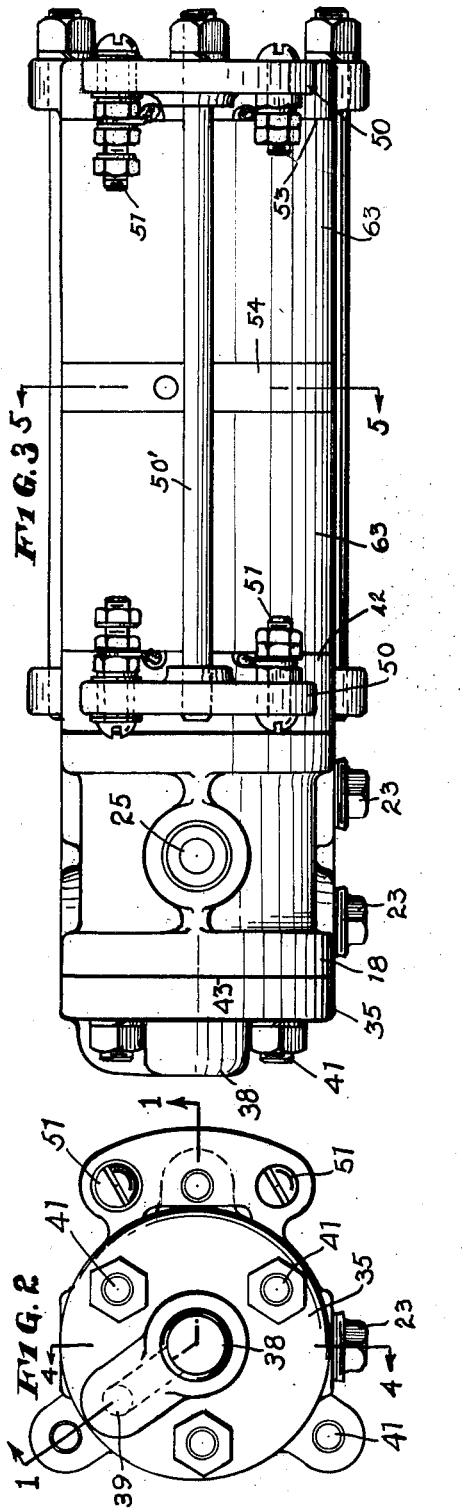
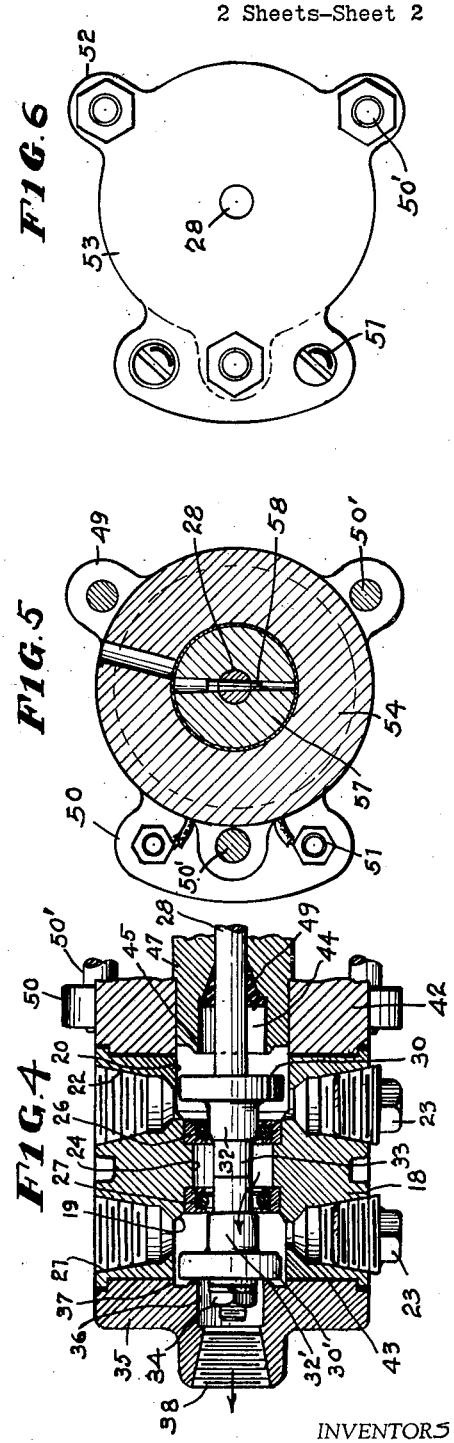
INVENTORS
JOHN R. ALMOND &
WILLIAM C. BOSWORTH
BY *Louis W. Schmidt*
ATTORNEY.

Patented July 11, 1950

2,515,029

UNITED STATES PATENT OFFICE 2,515,029

VALVE

John R. Almond, Cleveland, and William C. Bosworth, Lakewood, Ohio, assignors to The Midland Steel Products Company, Cleveland, Ohio, a corporation of Ohio Application September 10, 1945, Serial No. 615,442

5 Claims. (Cl. 251—76)

This invention relates to new and useful improvements in valves operated by an electromotive force and an important object of the invention is to provide an electrically controlled valve which is uniquely sealed against leaks and is pressure held in adjusted positions until the electro-motive force returns the valve to normal position, thereby providing a positively actuated valve requiring no springs.

Another object of the invention is to provide a double solenoid valve wherein an electro-motive force serves to operate the valve for directing fluid pressure acting to hold the valve in adjusted positions.

A further object of the invention is to provide a valve of the above character which is simple in construction, strong, durable, light and readily accessible for repair or refitting.

Other objects and advantages of the invention will become apparent during the course of the following description.

In the accompanying drawings forming a part of the description and wherein like numerals are employed to designate like parts throughout the several views.

Fig. 2 is an end elevation of the valve.

Fig. 3 is a top plan of the same.

Fig. 4 is a transverse section of the valve body taken on the line 4—4 of Fig. 2.

Fig. 5 is a transverse section taken through the solenoid actuator on line 5—5 of Fig. 3.

Fig. 6 is an elevation of the right hand end of the valve mechanism of Fig. 3.

Figure 1:
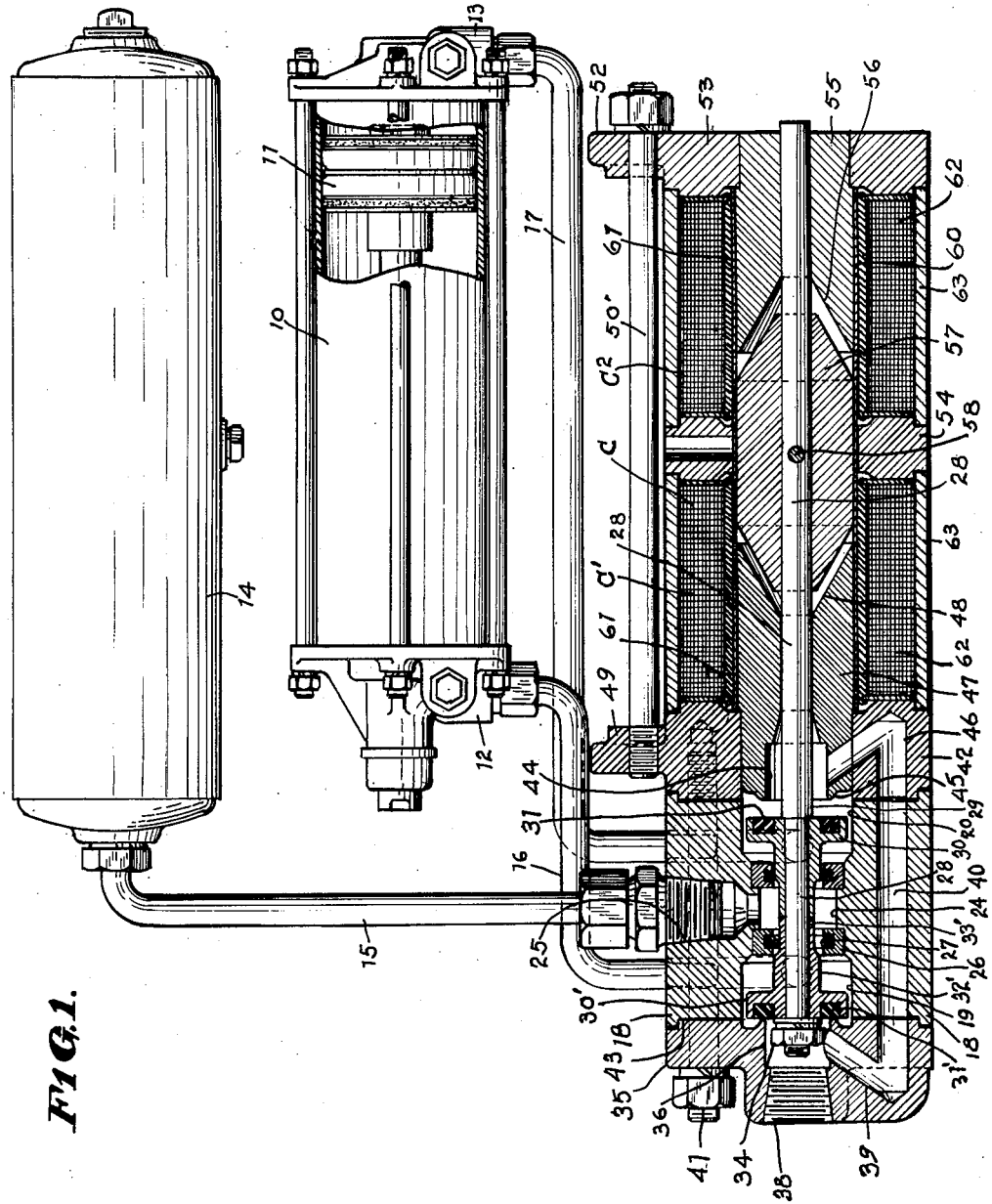
Fig. 1 is a longitudinal section through the electro-motive valve on the line 1—1 of Fig. 2, shown connected with a conventional system to perform work.

In the present illustration of one use of the invention, the electromotive valve is illustrated in an application to a bus door engine or operating cylinder 10 within which is reciprocated a piston 11 by subjecting opposite sides of the latter to differential pressures to cause it to move in one direction or the other. One end of the cylinder is provided with a combined inlet and outlet fitting 12 and the opposite end is provided with a similar fitting 13 whereby the actuating fluid medium may be entered and exhausted through either end of the cylinder as desired. A supply tank or reservoir 14 is provided to contain an actuating medium in the form of a pressure medium or liquid, or a vacuum condition, and is connected by pipe 15 with a control valve V, while a pipe 16 is extended from this valve to the fitting 12 at one end of the cylinder, and a pipe 17, also connected to the valve, extends to the fitting 13 on the opposite end of the door engine.

The valve V is a sectional affair and is composed of a central aluminum body or housing 18 of cylindrical form with a cylindrical bore extending axially therethrough with enlarged work chambers 19 and 20 at either end. The work chamber 19 has diametrically disposed ports 21 opening through opposite sides of the valve body, while the work chamber 20 has similarly disposed ports 22. In the present exemplification of the invention, only a single port is employed for each work chamber, while the other two ports are closed with suitable plugs 23. The port 21 is connected by the pipe 16 to one end of the work cylinder or door engine, while port 22 is connected to the other end of the door engine by means of pipe 17.

The intermediate portion of the bore through the valve body is of reduced area and forms a supply chamber 24 having a lateral port connected by a fitting 25 to the supply pipe 15 of the reservoir. A ring seal retainer 26 of brass is pressed into each end of the restricted bore for retaining an elastic sealing ring 27 in its relative position with a slight degree of axial movement in either direction caused by reciprocation of the valve. The elastic rings are of course, compressible and have a slight degree of clearance with their retaining grooves in the retainers 26 to be kept flexible while absolutely sealing off the work chambers from the supply chamber 24 under certain conditions as will be presently described.

A brass valve stem 28 extends axially through the bore in the valve body 18 and consequently the work and supply chambers, and is provided with a shoulder 29 against which a tubular valve head 30 engages within the work chamber 20. The valve head 30 has its face provided with an elastic ring sealing member 31 for engagement with a valve seat to be presently described. The hollow stem or sleeve portion of the valve head 30 is enlarged as at 32 and is of a diameter such that it frictionally engages its respective sealing ring 27 to compress the same and absolutely seal off the supply chamber 24 from the work chamber 20 when the valve head 30 disengages from its seat to exhaust the operating medium. The free or terminal end of the hollow sleeve is reduced as at 33 so that it can move axially through the sealing ring with suitable clearance to connect the supply chamber 24 with the work chamber 20 when the valve head 30 is seated. An identical valve head 30' is provided for the other work chamber 19 and its parts which correspond with the head 30 are marked with corresponding numerals with prime coefficients added thereto. These two tubular valve heads 30 and 30' are slipped upon the valve stem 28 in opposed relationship and their smaller reduced ends 33 and 33' are dressed and held in air tight relationship by a nut 34 screwed upon the end of the valve stem as illustrated, so as to force both valve sleeves together and the valve head 30 against the shoulder 29. Thus, these valve heads form a spool shaped valve and become substantially an integral part of the valve stem to move with the same.

The outer end of the valve housing 18 is closed by an aluminum head 35 which has an axial exhaust chamber 36 terminating at its inner end in an inwardly facing valve seat 37 and at its opposite end with an exhaust port 38. When the valve stem is in its extreme outer position, the valve head 30' engages the valve seat 37 to open the work chamber 19 to the supply chamber 24, since the reduced end 33' of the valve will clear the sealing ring 27 and permit communication between the supply chamber and work chamber 19 in order that the fluid medium may pass through pipe 16 to the left end of the work cylinder 10 and urge the piston 11 to the right of Fig. 1. In this position, the exhaust port 38 is cut off from the interior of the valve as is a diagonal exhaust port 39 which communicates with a common exhaust by-pass 40 through the main valve body, thereby exhausting the fluid medium from the opposite end of the valve out through the exhaust port 38. This outer closure head 35 is secured to the main body of the valve housing by means of three screws or bolts 41 extending lengthwise through the valve body and into the aluminum closure head 42 at the opposite end of the valve body. The opposite ends of the main valve housing 18 are countersunk to receive sealing gaskets 43 clamped by the two closure heads 35 and 42 when the bolts or screws 41 are tightened.

A cast iron closure head 42, like the head 35, is provided with an axial exhaust chamber 44 terminating in an inwardly extending valve seat 45 to cooperate with the valve head 30 when the valve stem is moved to the right of the Figure 1. A diagonal exhaust port 46 terminates in an angular branch like the exhaust port 39 to communicate with a common exhaust passage 40. A steel core piece 47 having an axial bore therethrough for the sliding reception of the valve stem 28 is press-fitted into the head 42 and has the exhaust chamber 44 and part of the diagonal exhaust passage 46 formed therein. Thus, the closure 42 and core piece 47 conjointly form the end closure for the right hand end of the valve housing 18. The coil end of the core piece 47 is provided with a tapered annular recess 48 to limit movement of the armature. The other end of the bore through the core piece 47 also has a tapered conical recess into which may be inserted a correspondingly shaped sealing gasket 49 when the valve is used in a vacuum system to prevent leakage of air inwardly into the valve housing.

The closure head 42 of the valve also forms one end of a magnetic coil C, and is provided as best appreciated from Figs. 2 and 5 with three radially extending fastening lugs 49, 50, one of which is larger than the others and in which a pair of binding posts 51 may be anchored as shown in Fig. 5. Each of these lugs is provided with a threaded aperture to receive corresponding ends of tie bolts 50 which extend on through corresponding lugs 52 in a cast iron end piece 53. Nuts are threaded on the ends of these tie bolts to clamp to magnetic coils C—1 and C—2 between a steel spacer disc 54 and the two cast iron heads 42 and 53 of the magnetic coils. The end piece 53 has a steel core piece 55 press-fitted therein in a manner similar to the core piece 47. The piece 55 has an axial opening in one end to slidably receive the end of the valve stem 28 and also has a conical recess 56 in its outer end to form a stop and into which one frustro-conical end of a steel armature 57 is adapted to operate. Binding posts similar to 51 are mounted on the larger lug of the end piece 53. An anchor pin 58 passes transversely through the armature and valve stem 28 so that when the armature moves in one direction or the other, it will correspondingly move the stem and valve heads 30 and 30'.

In order to mount magnetic windings of wire, or coils C—1 and C—2 on the core piece, a brass tube 60 is slipped over the core pieces 47 and 55 to mount fiber or cardboard bobbins 61 on opposite sides of the coil spacer 54. Upon each bobbin is wound a coil of wire and each coil is housed by a steel cylinder or shell 63 clamped between the spacer 54 and end pieces to exclude extraneous matter. The ends of each coil winding are connected to their respective binding posts 51 on the end pieces 42 and 53 and to an electrical circuit with two switches, not shown, so that when the coil C—1 is energized, the valve head 30' is moved to the left of Fig. 1 to seat upon the seat 37, while the valve head 30 is moved away from its seat, and when coil C—2 is energized the other valve head 30 will move to the right of Fig. 1 to seat upon its seat 45, while valve head 30' moves off its seat.

From the foregoing description it will be obvious, that when coil C—1 or C—2 is energized by completing the electrical circuit including such coil, the armature or plunger 57 will be attracted further into whichever coil is energized, thereby moving the valve stem 28 in one direction or the other. When either valve head is seated, it will be apparent that the enlarged portion 32 of the other valve head which is off its seat will have moved through the elastic sealing ring 27 to cut off the pressure chamber 24 from the exhaust, while the enlarged portion of the other valve head will be disengaged from its respective sealing ring 27 to permit fluid pressure to act upon the valve head which is seated and thereby more firmly hold such head upon its seat while directing air to the end of the working cylinder 10 which is desired to be energized. When the other coil C—2 is energized, the valve stem will be moved in the opposite direction, and thus the valve heads may be alternately unseated to admit the actuating medium to either end of the work cylinder thereby causing its piston to move in the direction desired to perform the desired work.

It will be understood that various changes in the size, shape and relation of parts may be resorted to without departing from the spirit of the invention or the scope of the appended claims.

We claim:

1. A valve comprising a housing having a pair of work chambers with oppositely directed valve seats, a pressure chamber communicating with each work chamber by a port, an elastic ring in each port, and a reciprocatory valve having spaced heads to alternately engage said seats and a stem extending through said ports, the stem being formed with cylindrical enlargements thereon the outer surfaces of which are adapted to alternately engage and disengage the elastic rings as piston valves to seal the work chamber in which the valve is open from the pressure chamber and connect the work chamber in which the valve is closed to the pressure chamber, the work chambers being provided with fluid outlets for connection to a controlled device and the pressure chamber being provided with a fluid inlet for connection to a source of fluid under pressure.

2. A valve comprising a body formed with a central chamber, a service chamber on each side of the central chamber provided with fluid ports for communication with a fluid motor, and an outer chamber on the opposite side of each service chamber from the central chamber, the central and outer chambers being provided with fluid ports for supply and discharge of fluid, and a first pair of passages interconnecting the central chamber and the service chambers and a second pair of passages interconnecting the service chambers with the adjacent outer chambers, each passage of one pair being provided with a valve seat, the seats facing in opposite directions; and a reciprocable valve member provided with poppets disposed to engage the said seats alternatively upon reciprocation of the valve member, and provided with piston valve members adapted to close alternatively the other said passages, the piston valve members being so located as to close one passage from each service chamber when the other passage from that service chamber is opened by the poppet valve member, and open the passage from the said service chamber when the other passage from that service chamber is closed by the poppet valve.

3. A valve comprising a body formed with a central chamber, a service chamber on each side of the central chamber provided with fluid ports for communication with a fluid motor, and an outer chamber on the opposite side of each service chamber from the central chamber, the central and outer chambers being provided with fluid ports for supply and discharge of fluid, and a first pair of passages interconnecting the central chamber and the service chambers and a second pair of passages interconnecting the service chambers with the adjacent outer chambers, each passage of one pair being provided with a valve seat, the seats facing in opposite directions; a reciprocable valve member provided with poppets disposed to engage the said seats alternatively upon reciprocation of the valve member, and provided with piston valve members adapted to close alternatively the other said passages, the piston valve members being so located as to close one passage from each service chamber when the other passage from that service chamber is opened by the poppet valve member, and open the passage from the said service chamber when the other passage from that service chamber is closed by the poppet valve; and yieldable annular sealing means cooperating with the periphery of each piston valve member and the wall of the passage closed by the said piston valve member.

4. A valve comprising a body formed with a central chamber, a service chamber on each side of the central chamber provided with fluid ports for communication with a fluid motor, and an outer chamber on the opposite side of each service chamber from the central chamber, the central and outer chambers being provided with fluid ports for supply of fluid under pressure from a source thereof and discharge of fluid respectively, a first pair of passages interconnecting the central chamber and the service chambers and a second pair of passages interconnecting the service chambers with the adjacent outer chambers, each passage of the second pair being provided with a valve seat, the seats facing the service chambers; a reciprocable valve member provided with poppets disposed to engage the said seats alternatively upon reciprocation of the valve member, and provided with piston valve members adapted to close alternatively the passages of the first pair, the piston valve members being so located as to close one passage from each service chamber when the other passage from that service chamber is opened by the poppet valve member, and open the passage from the said service chamber when the other passage from the said service chamber is closed by the poppet valve; and yieldable annular sealing means cooperating with each piston valve member and the wall of the passage closed by the said piston valve member.

5. A valve comprising a housing having a pair of work chambers with oppositely directed valve seats, a pressure chamber communicating with each work chamber by a port, an elastic ring in each port, and a reciprocatory valve having spaced heads to alternately engage said seats and a stem extending through said ports, the stem being formed with cylindrical enlargements thereon the outer surfaces of which are adapted to alternately engage and disengage the elastic rings as piston valves to seal the work chamber in which the valve is open from the pressure chamber and connect the work chamber in which the valve is closed to the pressure chamber, the work chambers being provided with fluid outlets for connection to a controlled device and the pressure chamber being provided with a fluid inlet for connection to a source of fluid under pressure, the area of the first-named valves being greater than that of the piston valves so that fluid pressure in the work chamber is effective to hold the head against the seat.

JOHN R. ALMOND.
WILLIAM C. BOSWORTH.

REFERENCES CITED

The following references are of record in the file of this patent:

UNITED STATES PATENTS

| Number | Name | Date |
|---|---|---|
| 109,371 | Bailey | Nov. 22, 1870 |
| 657,319 | Rawe | Sept. 4, 1900 |
| 658,915 | Jacobsen | Oct. 2, 1900 |
| 897,364 | Glauber | Sept. 1, 1908 |
| 1,016,167 | McCullock | Jan. 30, 1912 |
| 1,257,613 | Kocourek | Feb. 26, 1918 |
| 1,921,092 | Newton | Aug. 8, 1933 |
| 2,291,617 | Freygang | Aug. 4, 1942 |
| 2,360,733 | Smith | Oct. 17, 1944 |
| 2,374,593 | Ernst | Apr. 24, 1945 |
| 2,379,181 | Pontius | June 26, 1945 |